F. B. KLOCK.
CONVERTIBLE WHEEL OR SLEIGH VEHICLE.
APPLICATION FILED APR. 29, 1919.
1,375,008.
Patented Apr. 19, 1921.
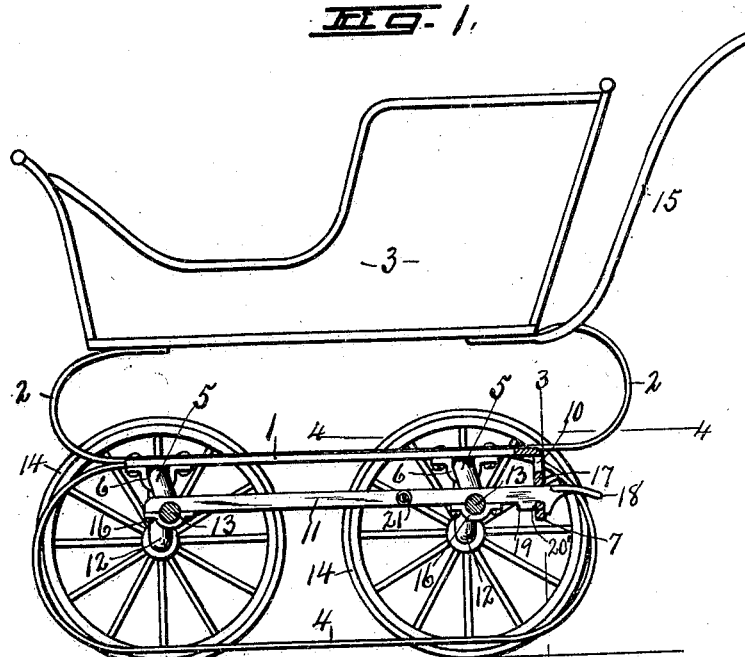
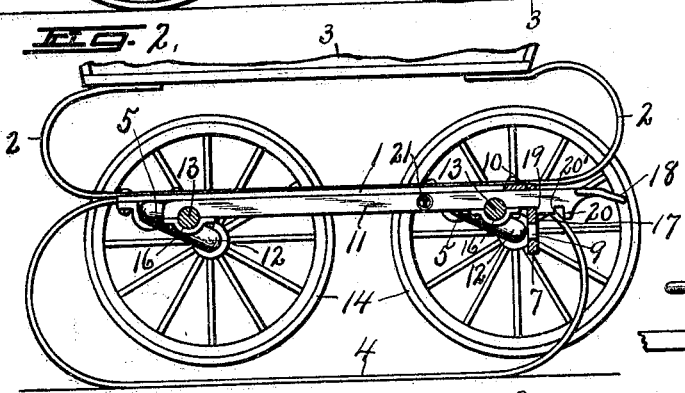
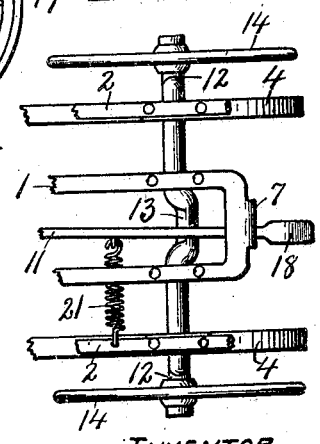
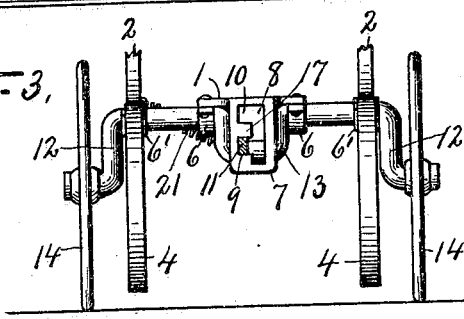
INVENTOR
F. B. Klock
BY Howard Denison
ATTORNEY.

UNITED STATES PATENT OFFICE.

FRANK B. KLOCK, OF LITTLE FALLS, NEW YORK.

CONVERTIBLE WHEEL OR SLEIGH VEHICLE.

1,375,008.     Specification of Letters Patent.      Patented Apr. 19, 1921.

Application filed April 29, 1919. Serial No. 293,550.

*To all whom it may concern:*

Be it known that I, FRANK B. KLOCK, a citizen of the United States of America, and resident of Little Falls, in the county of Herkimer, in the State of New York, have invented new and useful Improvements in Convertible Wheel or Sleigh Vehicles, of which the following, taken in connection with the accompanying drawings, is a full, clear, and exact description.

This invention relates to certain improvements in convertible wheel or sleigh vehicles adapted to be used more particularly as an infant carriage having supporting wheels and runners, either of which may be brought into engagement with the pavement or other supporting surface simultaneously with the withdrawal from such surface of the other supporting elements.

The main object is to provide simple and efficient means whereby the wheels and runners may be simultaneously shifted vertically in opposite directions into and out of engagement with the pavement or other supporting surface so that the carriage may roll or slide according to the condition of such surface or according to the presence or absence of snow or ice.

In other words, I have sought to enable the operator to easily and quickly convert the carriage from a wheel vehicle to a sleigh and vice-versa by the operation of a single shifting member from the rear of the carriage.

Another object is to provide simple means for automatically locking the shifting member and parts operated thereby in their adjusted positions.

Other objects and uses relating to specific parts of the carriage will be brought out in the following description:

In the drawings,—

Figure 1 is a longitudinal vertical sectional view of a convertible carriage embodying the various features of my invention in which the wheels are adjusted for contact with the pavement while the runners are withdrawn from the pavement.

Fig. 2 is a similar longitudinal vertical view except that the main portion of the body is broken away and that the runners are adjusted for contact with the pavement, and the wheels withdrawn therefrom.

Figs. 3 and 4 are respectively a transverse vertical sectional view, and a horizontal sectional view taken in the planes of lines 3—3 and 4—4 Fig. 1.

As illustrated, this vehicle comprises a frame or platform —1—, bow springs —2— for receiving and supporting a body —3—, a pair of runners —4—, and front and rear axles or shafts —5— which are journaled in suitable bearings —6— on the under side of the frame —1— near the ends thereof.

The frame or platform —1— is preferably flat and disposed in a substantially horizontal plane midway between the wheels or along the longitudinal center of the carriage and is provided at its rear end with an integral pendant flange —7— having a vertical slot —8— provided with lateral branches —9— and —10— for receiving the adjacent end of a shifting bar or lever —11—.

Each axle or shaft —6— is provided with opposite end crank arms —12— and an intermediate crank arm —13—, the crank arms —12— being arranged at opposite sides of and some distance from the frame —1— for receiving and supporting suitable wheels —14—, while the intermediate crank arms —13— are located in a vertical plane between the opposite sides of the frame —1— or in the longitudinal center of the vehicle for receiving and supporting the shifting bar or lever —11— shown more clearly in Figs. 1 and 2.

The crank arms —12— and —13— of each shaft, extends approximately in the same general direction from the axis of said shaft below the main body of the frame —1—, the intermediate crank arm —13— being somewhat shorter than the end crank arms —12— to reduce the amount of movement of the shifting lever —11— in shifting the wheels to and from the pavement, and at the same time allowing a relatively longer arc of movement of the wheels to permit the latter to clear the ground or pavement when the runners are adjusted for use in converting the carriage into a sleigh.

The runners —14— are preferably made of steel or other suitable metal and are arranged in parallelism lengthwise of the vehicle between opposite sides of the frame —1— and wheels —14—, the ends of both runners being curved upwardly and returned inwardly over the shafts or axles —5— and are provided with bearings —6'— in which the adjacent portion of the axles —5— are journaled just at the inside of and close to the crank arms —12—, the bearings —6— on the frame —1— being located just at the outside of and close to the intermediate crank arms —13—.

The body supporting springs —2— are mounted upon and secured to the upper sides of the runners —4— and are curved upwardly and inwardly toward each other as shown in Figs. 1 and 2, and are secured to the under side of the body —3— in any suitable manner, not necessary to herein illustrate or describe.

A handle —15— is also secured to the underside of the rear end of the body and extends upwardly and rearwardly therefrom for propelling the vehicle by hand.

The shifting bar or lever —11— is pivotally connected by bearings —16— to the intermediate crank arm —13—, said bearings —16— being spaced a distance apart corresponding to the distance between the shafts or axles —5— so as to hold the crank arms of both shafts in parallelism and thereby to impart similar movement to the wheels of both shafts.

These bearings —16— are sufficiently loose upon their respective crank arms —13— to permit the shifting bar —11— to move a limited distance laterally or axially of the shafts sufficient to allow the rear end of the lever to be moved from the main slot —8— into either of the branches —9— or —10— and vice-versa, said branches being separated by a stop-shoulder —17— which assists in holding the shifting lever and parts operated thereby in its adjusted position.

The rear end of the lever —11— extends some distance beyond the rear face of the flange —7— of the frame —1— and is provided with a pedal —18— by which the lever may be operated by the foot or by hand, if necessary.

The slot —8— is of sufficient length vertically to allow the adjacent portion of the shifting bar or lever —11— to play therein or to rise and fall as shafts —5— are rocked thereby about their axes in adjusting the wheels and runner to and from the ground or pavement, it being understood that during this adjustment, the shifting bar or lever —11— is also moved longitudinally.

This vertical adjustment of the wheels and runners is effected entirely by the longitudinal and vertical movement of the shifting bar or lever —11—, the rear end of which during said adjustment is registered with the main slot —8— in the pendant flange —7— of the frame —1—. In order that the parts may be held in their adjusted positions, the lower edge of the rear end of the shifting bar or lever is provided with shoulders —19— and —20— in longitudinally spaced relation for interlocking engagement with the lower walls of the branches —9— and —10— of the main slot —8— as shown more clearly in Figs. 1 and 2.

In adjusting the axles to bring the wheels into operation and to simultaneously withdraw the runners, the bar —11— is shifted forwardly a sufficient distance to bring the crank arms —12— to an upright position as shown in Fig. 1, at which time the rear end of the lever will be shifted laterally aided by spring —21— into branch slot —9— so that the shoulder —20— may engage the rear face of the lower wall of said branch. The lever is provided with an additional shoulder —20'—, a short distance in front of the shoulder —20— for engaging the front face of the lower wall of the same branch so that the two shoulders —20— and —20'— firmly hold the shifting rod against endwise movement and lock the parts which are shifted thereby in their adjusted positions. When the rear end of the lever is drawn by the spring —21— into the lower branch —9— of the slot —8—, the shoulder —17— holds the lever against upper displacement.

In adjusting the wheels and runners to permit the vehicle to be used as a sleigh as shown in Fig. 2, the shifting bar —11— is moved laterally from the lower branch —9— into the main slot —8—, and is then drawn rearwardly a sufficient distance to cause the wheels to be withdrawn from the pavement and the runners to be engaged therewith at which time the rear end of the lever will be registered with the branch —10—, and when released will be drawn into said branch by the spring —21— to allow the shoulder —19— to engage the rear face of the stop-shoulder —17— and thereby resist forward movement of the shifting bar by the weight of the elevated wheels —14— which then tend to exert downward and forward draft upon the shifting bar through the medium of the connection of said bar with the intermediate crank arms —13—.

It will be seen from the foregoing description, that immediately upon the release of the shifting bar —11— from its locked position shown in Fig. 1, a slight forward push of the body through the medium of the handle —15— will cause the crank arms of both shafts to rock rearwardly and upwardly until the runners or shoes —4— engage the ground whereupon the further upward and rearward swinging movement of the wheels clear of the ground, may be effected by drawing the shifting bar rearwardly until its rear end is registered with the upper branch —10— of the slot —8— at which time the lever will be automatically locked in a manner previously described.

In reverse manner, the wheels may be restored to engage the ground, and the runners withdrawn therefrom by simply tripping the lever from its locked position shown in Fig. 2, and then drawing rearwardly upon the body until the lever is again registered with the lower branch —9— of the slot —8— and interlocked with the walls thereof as previously described.

What I claim is:

1. In a convertible wheel or sleigh vehicle, the combination of front and rear axles having opposite end and intermediate crank-arms, wheels journaled on the end crank arms, a frame having journal bearings engaging both axles at opposite ends of the intermediate crank arm, and having its rear end provided with a vertical slot, a pair of runners having journal bearings engaging both axles between the intermediate crank arms and the end crank arms, and a shifting bar having journal bearings engaging the intermediate crank arms of both axles, and having its rear end extended through the slot in the rear end of the frame and provided with shoulders in longitudinally spaced relation for engaging the walls of said slot to hold the wheels and runners in different relative positions of adjustment.

2. In a convertible wheel or sleigh vehicle, the combination of front and rear axles having opposite end and intermediate crank arms, wheels journaled on the end crank arms, a pair of runners having their front and rear ends curved upwardly and returned inwardly over the corresponding axles and provided with journal bearings engaging their respective axles between the end crank arms and intermediate crank arms, a frame having journal bearings engaging the front and rear axles at points between the ends of the intermediate crank arm and journal bearings for the runners, said frame having its rear end provided with a vertical slot, and a shifting bar having journal bearings engaging the intermediate crank arms of the front and rear axles, and its rear end extended through the slot and provided with shoulders in longitudinally spaced relation for engaging the walls of said slot to hold the shaft against turning.

3. In a vehicle of the character described, the combination of a frame having a vertical slot, front and rear shafts journaled on the frame, and each provided with opposite end crank arms and an intermediate crank arm, wheels journaled on the end crank arms, runners supported by said shafts independently of the frame, and a shifting bar connected to the intermediate crank arms for rocking the shafts to raise and lower the wheels relatively to the runners, said shifting bar extending through the slot and provided with a shoulder for engaging the walls of the slot to hold the shifting bar and parts operated thereby in their adjusted positions.

4. In a vehicle of the character described, the combination of a frame, front and rear shafts journaled on the frame, and each provided with opposite end crank arms and an intermediate crank arm, wheels journaled on the end crank arms, runners mounted on the axles, a shifting bar connected to the intermediate crank arms and extending rearwardly beyond the rear shaft, a flange on the frame having a vertically elongated slot provided with lateral branches one above the other, the rear end of the shifting bar being movable in said slot and into and out of said branches and provided with means coöperating with the flange for holding the shifting bar and parts operated thereby in their adjusted positions.

In witness whereof I have hereunto set my hand this 25th day of April 1919.

FRANK B. KLOCK.

Witnesses:
 WM. WIMBLE,
 LOUISE RYAN.